United States Patent
Iraschko

(10) Patent No.: US 7,694,783 B2
(45) Date of Patent: Apr. 13, 2010

(54) LINKAGE POSITIONER FOR A DRUM BRAKE

(75) Inventor: Johann Iraschko, Schweitenkirchen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/942,399

(22) Filed: Nov. 19, 2007

(65) Prior Publication Data

US 2008/0128226 A1      Jun. 5, 2008

Related U.S. Application Data

(63) Continuation of application No. PCT/EP2006/004303, filed on May 9, 2006.

(30) Foreign Application Priority Data

May 20, 2005   (DE)   ................... 10 2005 023 409
Aug. 31, 2005   (DE)   ................... 10 2005 041 342

(51) Int. Cl.
  *F16D 55/02*    (2006.01)
(52) U.S. Cl. ................... 188/71.8; 188/71.2; 188/79.55
(58) Field of Classification Search ............... 188/71.2, 188/71.7, 71.8, 71.9, 72.7, 72.9, 79.51, 79.54, 188/79.55, 79.56, 79.63
See application file for complete search history.

(56) References Cited

U.S. PATENT DOCUMENTS

| 4,875,557 A | 10/1989 | Hagin et al. |
| 5,207,299 A * | 5/1993 | Feldmann ................ 188/79.55 |
| 6,651,784 B1 | 11/2003 | Barbosa et al. |
| 2005/0034935 A1 | 2/2005 | Maehara |

FOREIGN PATENT DOCUMENTS

| DE | 195 28 642 A1 | 2/1997 |
| EP | 0 614 025 B1 | 9/1994 |
| GB | 326483 | 3/1930 |

OTHER PUBLICATIONS

PCT/ISA/237 with English translation (Eleven (11) Pages).
International Search Report dated Jul. 5, 2006 with an English translation of the pertinent portions (Four (4) pages).
Chinese office action dated Mar. 6, 2009 with English translation.

* cited by examiner

*Primary Examiner*—Xuan Lan Nguyen
(74) *Attorney, Agent, or Firm*—Crowell & Moring LLP

(57) ABSTRACT

A linkage positioner for a drum brake, which is used to compensate for braking-related wear, especially on the brake linings, has an overload clutch and a one-directionally rotating or one-way clutch. The overload clutch is embodied as a ball ramp clutch, which is biased by a pressure spring.

8 Claims, 3 Drawing Sheets

LINKAGE POSITIONER FOR A DRUM BRAKE

This application is a continuation of international application PCT/EP2006/004303, filed May 9, 2006, the entire disclosure of which is incorporated herein by reference and which, in turn, claims priority of prior German applications 10 2005 023 409.7, filed May 20, 2005, and 10 2005 041 342.0, filed Aug. 31, 2005.

Cross-reference is also made to parallel international application PCT/EP2006/004306, as well as to the U.S. national phase application based on that parallel international application.

BACKGROUND AND SUMMARY OF THE INVENTION

This invention relates to a linkage adjuster for a drum brake to compensate for braking-induced wear at friction linings, having an overload clutch, and having a one-way rotational clutch or directional clutch.

In heavy utility vehicles, pneumatically actuated drum brakes are often used as friction brakes. A preferred type of construction is the so-called S-cam drum brake.

In order to generate a braking force, brake pads that form or support brake linings must be pressed in the radial direction from the inside against the drum of the drum brake. In the S-cam drum brake, this takes place by rotating a brake shaft, which has, at one end, a double involute in an S-shape. The two brake pads are supported with their ends on the cam, with the ends that are situated opposite these ends being fastened, for example, to a brake carrier so as to be pivotable about a bolt. For braking, the brake shaft with the S-cam must be rotated until the brake pads come into contact against the drum with the desired force. The rotation of the brake shaft takes place by way of a compressed-air-actuated brake cylinder, which generates a torque by way of a lever and transmits that torque to the brake shaft.

Since the brake pads or the brake linings become worn during braking, it is necessary to compensate for the brake lining wear with an alignment device. For this purpose, the brake shaft with the S-cam must be rotated by a corresponding magnitude in the direction in which the brake linings are adjusted towards the drum during the braking process, in order to move the brake pads closer to the inside of the drum. This direction is referred to as the application direction. However, in the rest position, a small gap must remain in order to ensure an efficient release behavior. Re-alignment can be carried out at regular intervals, and also manually. For this purpose, re-alignment must be carried out at the brake lever of the brake shaft on which the brake cylinder engages with its piston rod. Since manual adjustment is carried out neither according to requirements nor continuously, so-called automatic linkage adjusters are standard equipment on vehicles with S-cam drum brakes.

There are various linkage adjuster systems. The basic design is very similar, and is composed substantially of a worm gear, a worm, an overload or load shift clutch, a one-way clutch (usually operating on the wrap spring principle), a gearwheel, a toothed rack, and a so-called control disk. Such a mechanism is situated in a housing, which has a lever to which the brake cylinder is articulately connected. The brake shaft is coupled by way of a spline toothing to the worm gear.

With these linkage adjusters, there are two functional principles. According to one adjusting principle, adjustment takes place at the start of the braking process, while, according to the other adjusting principle, adjustment is carried out at the end of the braking process, or during the release process.

Reference is made as an illustrative example to European document EP 0 614 025 B1. This document describes an adjusting device for a disk brake, with both of the above-stated functional principles being used together by way of adjustment carried out at the start of the braking process and tensioning an elastic element. The elastic element is relaxed during the release process and brings about a further adjustment.

Linkage adjusters that are presently on the market do not always meet the expectations or demands with regard to durability and permanent functionality. A one-way clutch in the form of a wrap spring has been proven to be a component which is susceptible to wear. The function of this component is highly dependent on friction conditions, on the shaping, and on the dimensional stability of the mating faces. If wear and/or changes to the friction conditions occur over the course of time, failure of the component, and therefore of the entire linkage adjuster, can occur.

An object of the present invention is to create a linkage adjuster of the above-specified type with a mechanism that has a high level of robustness and that has a functional behavior that is influenced as little as possible by friction value fluctuations and production tolerances. A further object is to provide the most cost-effective production possible.

According to the invention, therefore, a linkage adjuster for a drum brake that compensates for braking-induced wear in particular at friction linings includes an overload clutch and a one-way rotational clutch or directional clutch. The overload clutch is configured as a ball ramp clutch that is preloaded by a pressure spring.

Again, a linkage adjuster according to the invention is for adjusting the braking-induced wear at the friction linings.

In one preferred embodiment, the directional clutch is embodied as a clamping body freewheel. This results in precise functional behavior by the use of precise and friction-independent components.

In a further embodiment, the ball ramp clutch is composed of oppositely arranged end faces, each of which is formed with ball pockets for balls arranged between those faces. Here, it is particularly advantageous for all the moving components of the adjuster mechanism to be mounted by ball bearings, since a high level of efficiency is permitted in this way.

In another embodiment, the overload clutch and the directional clutch together form a ball lock clutch. Here, it is preferable for the ball lock clutch to be composed of two oppositely arranged ramp contours with balls arranged between the contours. In a particularly preferred embodiment, the ramp contours have at least two different gradients. This is advantageous, since it results in a precise functional behavior, because the freewheel function and the overload function are defined only by the shaping and the preload force, and therefore friction has no influence on the functional behavior.

In an alternative embodiment, the ramp contours have a curved design.

It is advantageous for the ball lock clutch to have a cone clutch, since, in this preferred embodiment, favorable production of the components is possible because the significant components of the adjuster mechanism are to be produced by non-cutting shaping processes.

The ramp contours and the balls arranged in between those contours are additionally held against one another by a torsion spring.

A drum brake according to the invention has a linkage adjuster according to the invention.

Further advantages, details and features of the invention can be gathered from the following detailed description in connection with the appended drawings.

BRIEF DESCRIPTION OF THE DRAWINGS

The invention is explained in more detail below on the basis of the exemplary embodiment illustrated in the drawing figures.

DETAILED DESCRIPTION OF THE INVENTION

The same reference symbols in the individual figures denote identical or functionally equivalent parts.

Figure 1:
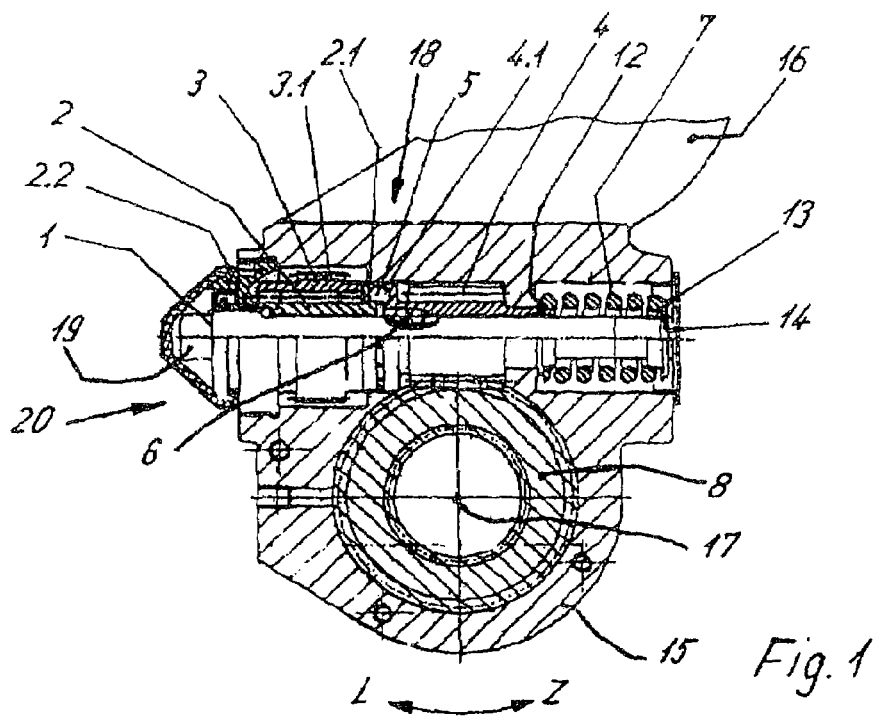
FIG. 1 shows a section illustration of an exemplary first embodiment of a linkage adjuster according to the invention.
Figure 2:
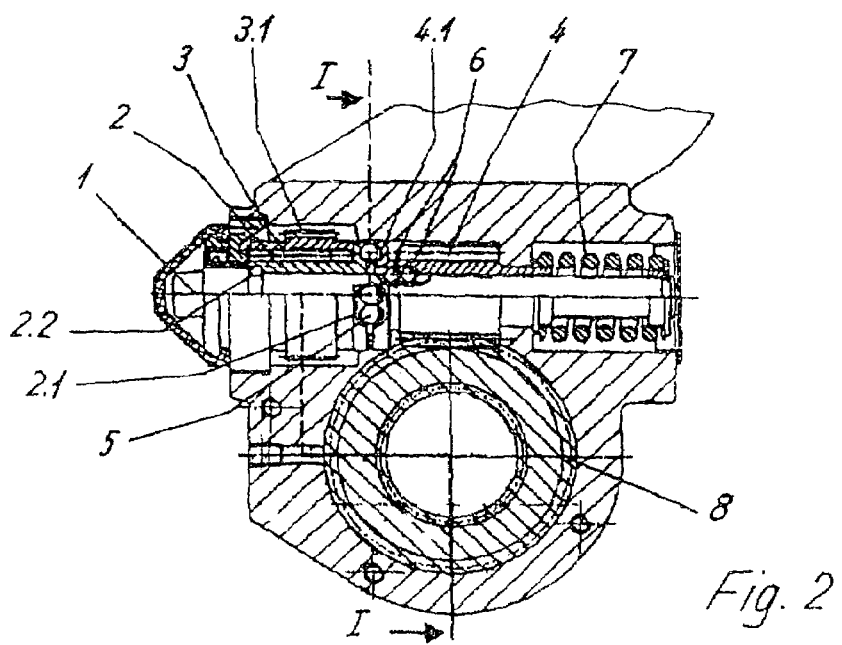
FIG. 2 shows an expanded section illustration of the linkage adjuster of FIG. 1.
Figure 3:
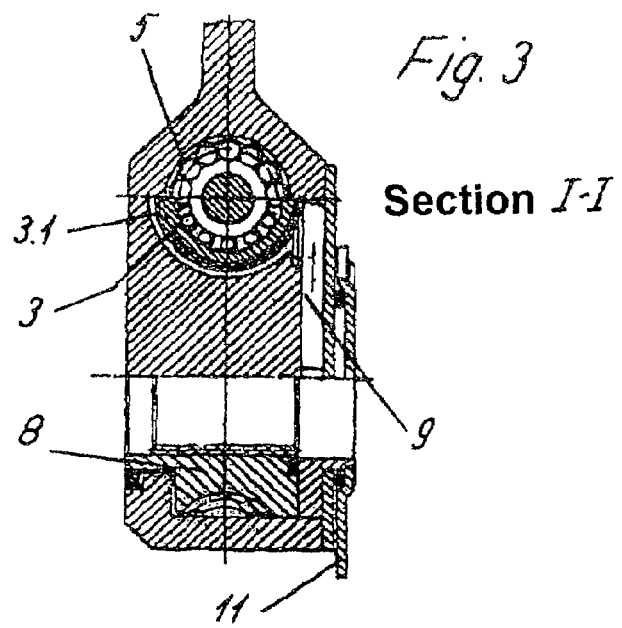
FIG. 3 shows a section illustration along the line I-I of the linkage adjuster of FIG. 1.

FIG. 1 shows a section illustration of an exemplary first embodiment of a linkage adjuster 20 according to the invention.

The adjuster mechanism of the first embodiment is composed of the following individual components: a shaft 1; a clamping bush 2 with first ball pockets 2.1, which are arranged at the end side on the one side and with an axial bearing 2.2 on the other side adjacent to a first end of the shaft 1; a clamping body freewheel 3 with outer toothing 3.1; a worm 4 with second ball pockets 4.1, which are arranged at the end side and which are arranged facing the first ball pockets 2.1; a plurality of balls 5 for a ball ramp clutch 18; a plurality of blocking balls 6 for transmitting a torque between the shaft 1 and the worm 4; a preload spring 7 with support plates 12, 13 and a securing ring 14; a worm gear 8; a toothed rack 9; a control disk 10; and a fixing lever 11.

The linkage adjuster 20 is arranged in a housing 15, with an axis 17 of the worm gear standing perpendicular on the plane of the drawing and the longitudinal axis of the shaft 1 of the linkage adjuster running at right angles to the axis 17. In this example, a lever 16 is arranged on the housing 15 above the shaft 1. This lever 16 is operatively connected to a brake cylinder (not illustrated).

Situated within the worm gear 8 is a brake shaft (likewise not illustrated) which, at its end, which is not shown here, has an S-cam formation which, in a known way, actuates the brake pads of a drum brake. The brake shaft runs in the direction of the axis 17 and is rotationally fixedly connected to the worm gear 8. By actuating the lever 16 in the direction Z, which is illustrated by arrows, the brake linings are pushed apart, and in the direction L, a release of the brake linings takes place in a known way. The direction Z is referred to as the application direction and the direction L is referred to as the release direction.

The clamping body freewheel 3 performs the function of a directional clutch and is an industrially produced precision component that is designed and dimensioned for a long service life and functional reliability.

The ball ramp clutch 18 is formed from the first ball pockets 2.1 of the clamping bush 2 and the second ball pockets 4.1 of the worm 4, between which ball pockets 2.1, 4.1 the balls 5 are arranged in a suitable number. The ball ramp clutch 18 serves as an overload or load shift clutch, and is preloaded by the preload spring 7. The preload spring 7 is provided between the first support disk 12, which bears against the worm 4, and the second support disk 13, which is arranged at the second end of the shaft 1. Axial fixing of the preload spring 7 to the shaft 1 takes place by way of the securing ring 14 at the second shaft end, which is situated opposite the first shaft end with the clamping bush 2. The preload spring 7 therefore exerts an axial pressure force via the first support disk 12 and the worm 4, which axial pressure force is transmitted via the second ball pockets 4.1 and the balls 5 to the clamping bush 2.

In this way, the response torque of the ball ramp clutch is defined only by the spring preload force and the shaping of the ball pockets 2.1 and 4.1, in contrast to friction clutches. The ball pockets 2.1 and 4.1 are, for example, formed in the shape of ramps. Since this embodiment involves a purely rolling movement with so-called punctiform contact, virtually wear-free and, therefore, durable operation is ensured, because the two functional elements have, over the course of time, already proven their excellence in the applicant's pneumatically actuated disk brakes of the SB and SN-type series.

A functional description of the first embodiment now follows with reference to FIGS. 1 to 5.

Adjustment takes place at the start of a braking process. If pressure is introduced into the associated brake cylinder by way of a medium, which in the present case is air, then the piston rod of the brake cylinder is deployed and, via the lever 16, actuates the housing 15, with a pivoting movement taking place about the axis 17 in the application direction Z. The force transmission required for this purpose runs from the lever 16 via the upper section of the housing 15, the shaft 1, and the worm 4 to the worm gear 8, which is rotationally fixedly connected to the brake shaft, as is explained above and can be seen in FIG. 2 as well as in FIG. 3, in the section illustration along line I-I of FIG. 2.

Figure 4:
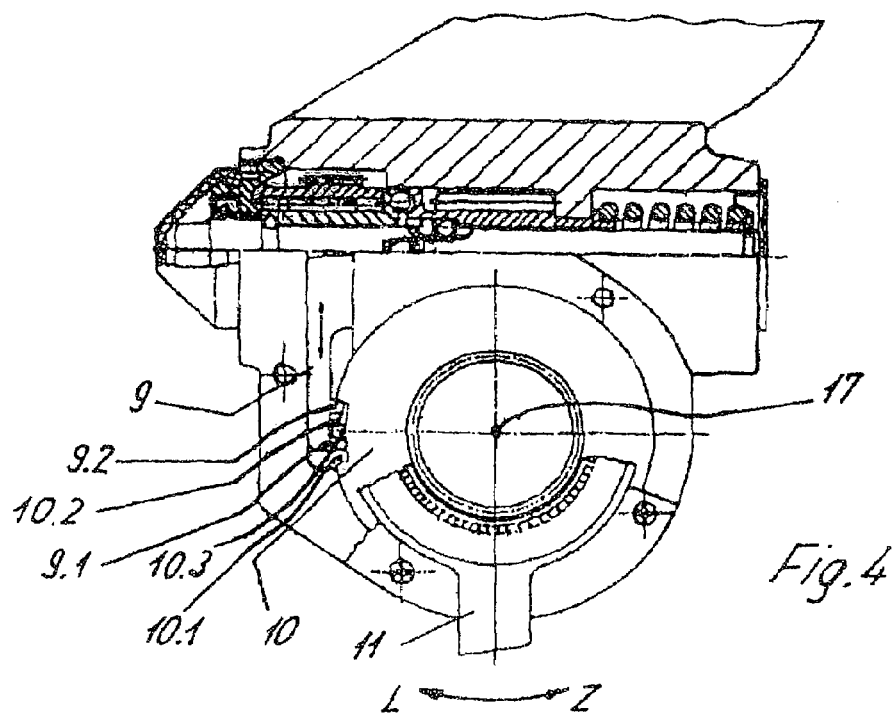
FIG. 4 shows a schematic illustration of a control disk with a toothed rack of the linkage adjuster of FIG. 1.

Reference is now made to FIG. 4, which shows a schematic illustration of a control disk 10 with a toothed rack 9 of the linkage adjuster 20.

The toothed rack 9 is operatively connected to the shaft 1 of the linkage adjuster 20 by way of the outer toothing 3.1 of the clamping body freewheel 3, with the toothed rack 9 being arranged so as to be movable in the direction of the arrow. At its lower end, the toothed rack 9 has a first cam 9.1 and a second cam 9.2, which are arranged with a spacing. Each of the cams 9.1 and 9.2 is in respective engagement with a first notch 10.1 and a second notch 10.2, which notches are separated by a tooth 10.3 and are arranged on a section of the periphery of a control disk 10. The control disk 10 is fastened by a fixing lever 11 in such a way that the control disk 10 is stationary relative to the pivoting movement of the housing 15.

In the first phase of the course of the movement, a so-called idle travel between the first cam 9.1 of the toothed rack 9 and the first notch 10.1 in the stationary control disk 10 is overcome. The magnitude of this idle travel, that is to say the dimensioning of the cam 9.1 and the notch 10.1, determines the air play between the brake pads and brake drum.

In the next phase, the first cam 9.1 of the toothed rack 9 comes into contact against the shoulder of the first notch 10.1 of the control disk 10. There are now two possible operating states here.

Case 1: If the air play is correct, then the brake pads come into contact against the drum inner wall at the same time as the contact of the cam 9.1 of the toothed rack 9. An adjustment is now no longer possible on account of the high forces, but on account of the elasticities in the components of the drum brake, a further rotation at the linkage adjuster 20 is carried out. In order that this is possible without damage to the adjusting mechanism in the linkage adjuster 20, the function of the overload clutch in the form of the ball ramp clutch 18 comes into effect. Here, the balls 5 roll up the ball ramps of the ball pockets 2.1, 4.1 and, in doing so, press the clutch halves, that is to say the opposing end faces of the clamping bush 2 and of the worm 4, apart counter to the spring preload force of the preload spring 7. Further rotation by way of the outer toothing 3.1 of the clamping body freewheel 3, therefore, cannot bring about a rotation of the worm 4 and of the worm gear 8.

Case 2: If the air play between the brake pads and brake drum is too great, a rotational movement is introduced into the ball ramp clutch 18 by the toothed rack 9 and the outer toothing 3.1, which is connected to the clamping body freewheel 3, on account of the blocking action of the clamping body freewheel 3. Since the response torque of the ball ramp clutch 18 is greater than the torque of the worm 4, which is to be driven, the latter is rotated together with the worm gear 8. The play between the brake pads and brake drum is therefore reduced. When, in the further course, the brake pads come into contact against the brake drum, the process is as described in case 1.

During the release of the brake, the ball ramp clutch 18 (overload clutch) first returns into the rest position. The linkage adjuster 20 rotates back into the rest position in the load-free state by way of the restoring spring. Here, the cam 9.1 of the toothed rack 9 moves onto the other side of the abutment shoulder of the notch 10.1 in the stationary control disk 10. If an adjustment according to case 2 has taken place during the actuation of the brake, the freewheel 3 is turned back in the release direction L by the rotational angle of the worm 4 additionally carried out for the adjustment action.

Manual restoring of the linkage adjuster 20 takes place in the usual way by turning the adjuster shaft 1 back by way of a suitable tool, for example a screw wrench, which is engaged onto a suitable projection 19 at the first end of the shaft 1. Here, the two clutch halves of the ball ramp clutch 18, that is to say clamping bush 2 and worm 4, are pushed apart and rotated until the balls 5 spring into the next clamping pockets or ball pockets 2.1, 4.1. The worm 4 can therefore be rotated counter to the blocking action of the clamping body freewheel 3.

In this way, a linkage adjuster 20 having the following advantageous features is created.

Precise functional behavior is provided due to the use of precise and friction-independent components such as the clamping body freewheel 3 and ball ramp clutch 18.

Little functional hysteresis and high efficiency are produced, since all the moving components of the adjuster mechanism are mounted by ball bearings.

Long service life and a high level of permanent functional reliability are provided, since all the moving parts are mounted by ball bearings and, therefore, no significant wear can occur.

Figure 5:
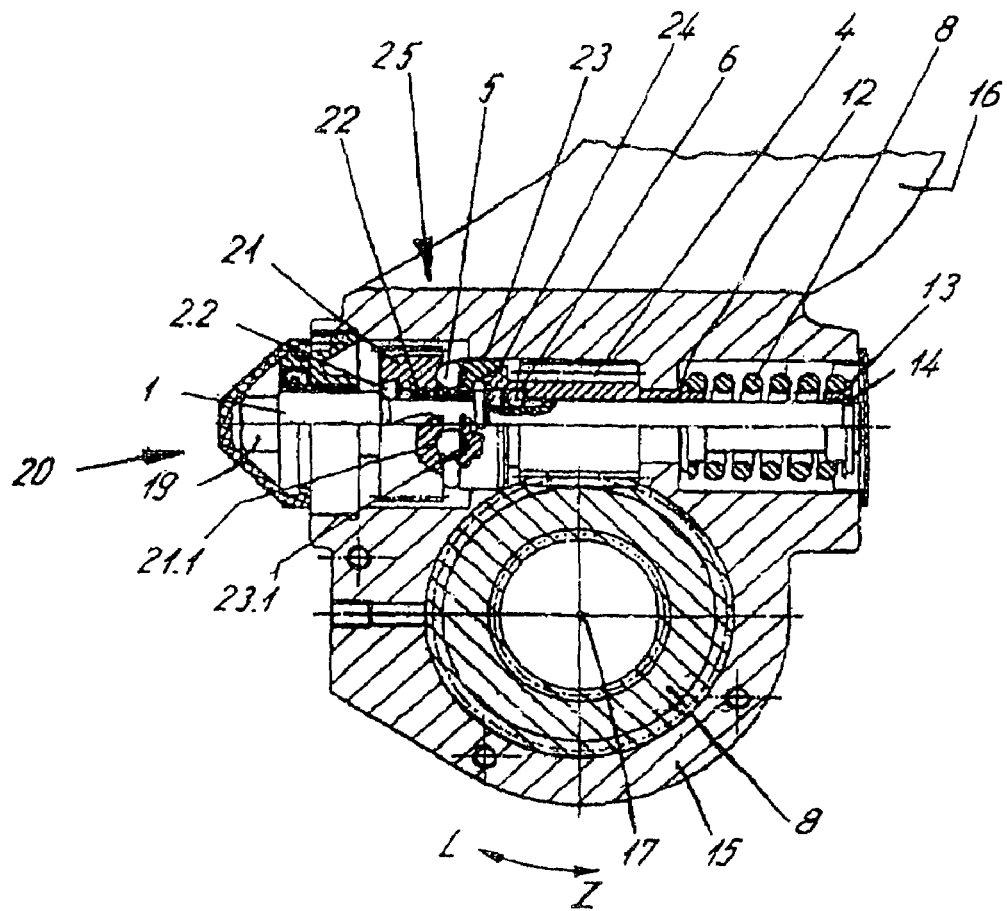
FIG. 5 shows a section illustration of an exemplary second embodiment of the linkage adjuster according to the invention.

FIG. 5 shows a second embodiment of the linkage adjuster 20 according to the invention, with further developed adjuster technology. Here, the particular advantages are that a further improvement of the functional behavior, simplified production, and a structural design that is not tolerance-sensitive are created.

With this embodiment, one particular advantage is that the freewheel function and the overload clutch function are combined in a single module, or a so-called ball lock clutch 25.

The adjusting mechanism is composed of the following individual parts: a shaft 1; an externally-toothed drive input disk 21 with an end-side ramp contour 21.1 and an axial ball bearing 2.2; a plurality of balls 5; a torsion spring 22 for forcing the balls 5 against the ramp contour 21; a cone disk 23 with an end-side ramp contour 23.1; a worm 4 with an outer cone 24; a plurality of blocking balls 6 for torque transmission; and a preload spring 7 with associated support rings 12, 13, and securing ring 14.

These components are designed such that non-cutting, and therefore cost-effective, production is possible. Since all the components which move under load are mounted in a rolling fashion on balls with punctiform contact, a long service life and precise, stable functional behavior are ensured.

A functional description with reference to FIGS. 1 to 5 follows. The functions of the toothed rack 9 with the cam 9.1 and of the control disk 10 with the notch 10.1 are not described in any more detail here, but reference is made in this regard to the above description.

In case 1, in the second exemplary embodiment, damage to the adjusting mechanism in the linkage adjuster 20 is prevented because the overload function of the ball lock clutch 25 comes into effect. Above a force threshold defined by the preload spring 7, the balls 5 of the blocking clutch 25 roll in the ball pockets up ramps which are formed obliquely by the ramp contours 21.2 and 23.1. The gradient angle of the ramp raceways is considerably greater at the start so that as great a force threshold as possible is obtained. After the response threshold is overcome, in order to protect the drive input elements, a low clutch torque is advantageous. In the further course of the raceway, therefore, the gradient angle of the ramp contour is, in this example, designed to be smaller than at the start.

With regard to case 2, in the second exemplary embodiment, if the air play between the brake pads and brake drum is too great, a rotational movement is introduced into the cone clutch, which is composed of the cone disk 23 and the outer cone 24 of the worm 4, by the toothed rack 9 and the ball lock clutch 25. Since the unlatching torque of the preloaded ball lock clutch 25 is greater than the torque of the worm 4 to be driven, the latter is rotated together with the worm gear 8. The play between the brake pads and brake drum is therefore reduced. When, in the further course, the brake pads come into contact against the brake drum, the function process is as already described in case 1.

During release of the brake, the balls 5 of the ball lock clutch 25 first return to their rest positions. The linkage adjuster 20 rotates back into the rest position in the load-free state by way of the restoring spring. Here, the cam 9.1 of the toothed rack 9 moves onto the other side of the abutment shoulder of the notch 10.1 in the stationary control disk 10. If an adjustment has taken place during actuation of the brake, the freewheel function of the ball lock clutch 25 comes into effect. Since the balls 5 in the rest position are relieved of the load by the preload spring 7 and are forced against the ball raceways 21.1, 23.1, with a small force only, by the torsion spring 22, it is possible to turn back in the release direction L by the rotational angle at the worm 4 additionally carried out for the adjustment process.

Manual restoring of the linkage adjuster 20 likewise takes place here in the usual way by turning the adjuster shaft 1 back by way of a screw wrench. Here, the two clutch halves 21.1 and 23.1 of the ball lock clutch 25, that is to say the drive input disk 21 and cone clutch 23, 24, are pushed apart until the balls 5 reach the end of the ball ramp raceways. On account of the gradient angle change of the ball raceways, which is considerable, no self-locking occurs in the ball lock clutch 25 in this case. The relative movement takes place here within the cone clutch 23, 24, and the worm 4 can therefore be rotated counter to the stationary ball lock clutch 25.

The second embodiment of the linkage adjuster 20 has the following advantageous features.

Precise functional behavior is provided, since the freewheel function and the overload function are defined only by the shaping and the preload force, and therefore friction has no influence on the functional behavior.

Little functional hysteresis and high efficiency are produced, since all the moving components of the adjuster mechanism are mounted by ball bearings.

Long service life and a high level of permanent functional reliability are provided, since no significant wear can occur on account of the ball-bearing-mounted components.

Favorable production results, since the significant components of the adjuster mechanism can be produced by non-cutting shaping processes.

The above-described embodiments are merely exemplary and do not restrict the invention. Variations and modifications are obvious and possible to a person skilled in the art.

It is thus for example possible for the toothed rack 9 to also have a second cam 9.2 and for the control disk 10 to have a second notch 10.2. Further cams and notches are likewise possible.

It is conceivable for the ramp contours 21.1, 23.1 or ball pockets 2.1, 4.1 to have more than two different gradient angles. Curved raceways, of course, are also possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A linkage adjuster for a drum brake for adjusting braking-induced wear at friction linings, comprising:
    an overload clutch formed from rolling elements and adjacent parts of a clamping bush and a worm, movable toward and away from each other, between which the rolling elements are disposed, and
    a one-way rotational clutch or directional clutch,
    wherein the overload clutch is a ball rolling element ramp clutch that is preloaded by a pressure spring to bias said adjacent parts toward each other and
    wherein the rolling elements press the adjacent parts away from each other against a force provided by the pressure spring upon excessive rotation of the linkage adjuster.

2. The linkage adjuster as claimed in claim 1, wherein the directional clutch is a clamping body freewheel.

3. The linkage adjuster as claimed in claim 1, wherein the rolling elements are balls, and the adjacent parts are oppositely arranged end faces, each of which is formed with ball pockets for the balls which are arranged in between the faces.

4. The linkage adjuster as claimed in claim 2, wherein the rolling elements are balls, and the adjacent parts are oppositely arranged end faces, each of which is formed with ball pockets for the balls which are arranged in between the faces.

5. A drum brake having a linkage adjuster for a drum brake for adjusting braking-induced wear at friction linings, comprising:
    an overload clutch formed from rolling elements and adjacent parts of a clamping bush and a worm, movable toward and away from each other, between which the rolling elements are disposed, and
    a one-way rotational clutch or directional clutch,
    wherein the overload clutch is a rolling element ramp clutch that is preloaded by a pressure spring to bias said adjacent parts toward each other, and
    wherein the rolling elements press the adjacent parts away from each other against a force provided by the pressure spring upon excessive rotation of the linkage adjuster.

6. The drum brake as claimed in claim 5, wherein the directional clutch is a clamping body freewheel.

7. The drum brake as claimed in claim 6, wherein the rolling elements are balls, and the adjacent parts are oppositely arranged end faces, each of which is formed with ball pockets for the balls, which are arranged in between the faces.

8. The drum brake as claimed in claim 5, wherein the rolling elements are balls, and the adjacent parts are oppositely arranged end faces, each of which is formed with ball pockets for the balls, which are arranged in between the faces.

* * * * *